M. T. LYON.
TRUCK FOR GARBAGE CANS.
APPLICATION FILED NOV. 22, 1909.
1,013,605.
Patented Jan. 2, 1912.
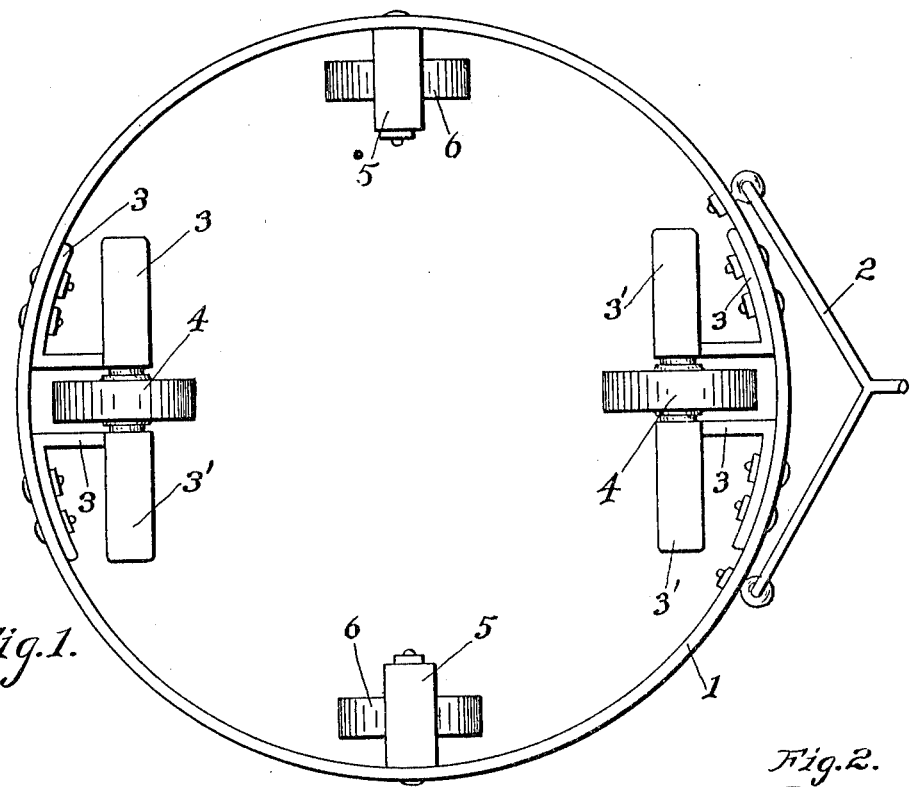
Fig. 1.
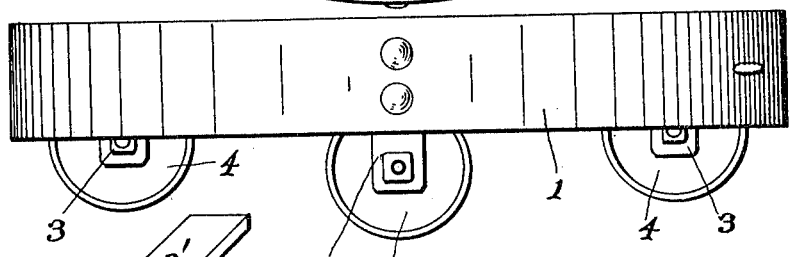
Fig. 2.
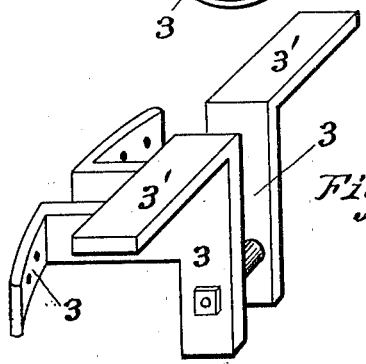
Fig. 3.
Fig. 4.
Witnesses
E. V. Simpson
A. L. Smith
Matthew T. Lyon
Inventor
by J. M. Thomas
Attorney

UNITED STATES PATENT OFFICE.

MATTHEW T. LYON, OF SALT LAKE CITY, UTAH.

TRUCK FOR GARBAGE-CANS.

1,013,605. Specification of Letters Patent. Patented Jan. 2, 1912.

Application filed November 22, 1909. Serial No. 529,477.

*To all whom it may concern:*

Be it known that I, MATTHEW T. LYON, a citizen of the United States, residing at Salt Lake City, in the county of Salt Lake and State of Utah, have invented certain new and useful Improvements in Trucks for Garbage-Cans, of which the following is a specification.

The purpose of my invention is to provide a truck for garbage cans, and the like, which is strong, economical in construction and which may be turned or moved in any direction on the ground, and by which a can may be transported either attached to or entirely separate from the truck. These objects I attain by the device illustrated in the accompanying drawings, in which similar letters of reference indicate like parts throughout the several figures.

Figure 1, is a plan view of my truck. Fig. 2, is a side elevation of the same. Fig. 3, is a detail of one of the wheel bearings. Fig. 4, is a detail of one of the other bearings.

I am aware of the fact that other trucks for like purposes have been used, but so far as is known to me, none possess the distinctive features of cheapness, strength, and mobility of my truck.

I provide a band 1, of size sufficient that the can may fit therein, to which band is fitted a handle 2, or tongue. On the inside of the band, is attached bearing and support members 3, the purpose being to provide a bearing for the axle of the wheels and at the same time a support for the can, when the lower end of it is placed within band 1. Said bearing and support members are attached by bolts or rivets near the horizontal center of said bearing 1, so placed that the bearing members may act as bearing for the wheels 4, and the support member, formed as a bracket and indicated in the drawings 3', may support the can. And should the can be constructed with a depending flange on the bottom thereof, the portion of the said member 3 that is attached to the bottom of the ring may act as a support for the bottom of the flange. Diametrically opposite in the band 1, is similarly attached the other wheel 4. Within and to the band and diametrically opposite each other, are attached inverted U shaped members 5, the legs of each of said U shaped members form the bearings for one of the side wheels 6, the upper portions of said U shaped members are in the same plane as the bracket supports 3'. The purpose being to have that part of each of the said U shaped members act equally with the bracket supports 3' as a support for the can. The wheels 6 are located on a lower plane than are the wheels 4, by having longer bearing posts, or the bearing posts may be the same length as the bearing posts for the wheels 4, and the wheels 6 larger. The purpose of this difference in the size of the wheels or of the length of the bearing posts is that the truck may be turned on the two side wheels 6 and for convenience tilted or tipped to the front or back to make said movement easy.

A garbage can placed within my truck may be moved in any direction on the ground, and transported to where it is emptied. The segregation of the truck and can, which is provided for by my truck, enables me to move the garbage can with greater ease than when attached to the truck. However, if desired the can and truck may be secured together.

Having thus described my invention, I desire to secure by Letters Patent and claim—

1. In a truck for garbage cans the combination of a band, individual bearing members for front and rear wheels attached within said band, one portion of each of said bearing members being extended above the wheel as a can support, and wheels mounted in said members with the tread of the two side wheels placed lower than the tread of the front and rear wheels.

2. In a garbage can truck the combination of a band, two double-bracket shaped bearings secured within and to said band and having a portion thereof laterally extended as a can support, two inverted U-shaped bearings also secured within said band with the upper portion of each of said U-shaped bearings in a plane of the laterally extended portions of the said bracket shaped bearings adapted to support a can to be placed within said band, and a wheel mounted in each of said bearings with the axles thereof parallel and with the tread of the two side wheels on a lower plane than the front and rear wheels.

3. In a truck for a garbage can the combination of a band, a bracket shaped bearing member for a front wheel and one for a rear wheel diametrically secured within said band having two portions of each of said bearing members laterally extended as a can support, a wheel mounted in each of said bearing members having the treads thereof below the laterally extended portions of said members, two U-shaped bearing members secured within and to said band and having portions thereof placed in the same plane as the laterally extended portions of said bracket shaped bearing members, and a wheel mounted in each of said U-shaped bearings with the tread of each wheel lower than the tread of the first mentioned wheels.

In testimony thereof I have affixed my signature in the presence of two witnesses.

MATTHEW T. LYON.

Witnesses:
W. E. WOOD,
SAM RANEY.